United States Patent
Tsujii et al.

(10) Patent No.: US 8,285,023 B2
(45) Date of Patent: Oct. 9, 2012

(54) RADIATION IMAGE PROCESSING APPARATUS AND METHOD THEREOF

(75) Inventors: Osamu Tsujii, Utsunomiya (JP); Yuichi Nishii, Tokyo (JP); Hiroyuki Urushiya, Saitama (JP); Kazuhiro Matsumoto, Saitama (JP); Hiroyuki Shinbata, Tama (JP)

(73) Assignee: Canon Kabushiki Kaisha, Tokyo (JP)

( * ) Notice: Subject to any disclaimer, the term of this patent is extended or adjusted under 35 U.S.C. 154(b) by 1076 days.

(21) Appl. No.: 12/201,343

(22) Filed: Aug. 29, 2008

(65) Prior Publication Data
US 2009/0060309 A1  Mar. 5, 2009

(30) Foreign Application Priority Data
Aug. 30, 2007 (JP) ................... 2007-224611

(51) Int. Cl.
G06K 9/00 (2006.01)
(52) U.S. Cl. ....................................... 382/131
(58) Field of Classification Search ............. 382/128, 382/131
See application file for complete search history.

(56) References Cited

U.S. PATENT DOCUMENTS

| | | | |
|---|---|---|---|
| 7,415,145 B2 * | 8/2008 | Hsieh et al. | 382/131 |
| 2002/0054659 A1 * | 5/2002 | Okumura et al. | 378/19 |
| 2007/0172028 A1 | 7/2007 | Tsujii | |
| 2009/0034818 A1 * | 2/2009 | Morita | 382/131 |

FOREIGN PATENT DOCUMENTS

| | | |
|---|---|---|
| JP | 10-043178 A | 2/1998 |
| JP | 2002-191593 A | 7/2002 |
| JP | 2002-224100 | 8/2002 |
| JP | 2003-038480 A | 2/2003 |
| JP | 2004-194869 | 7/2004 |
| JP | 2004-215961 | 8/2004 |
| JP | 2005-021670 | 1/2005 |
| JP | 2005-065837 A | 3/2005 |

OTHER PUBLICATIONS

"Practical cone-beam algorithm" Journal of the Optical Society of America A,, 612-619 US Feb. 28, 1984, L. A. Feldkamp, L. C. Davis and J. W. Kress.
The above references were cited in a Feb. 17, 2012 Japanese Office Action, which is enclosed without an English Translation, that issued in Japanese Patent Application No. 2007-224611.

* cited by examiner

*Primary Examiner* — Clayton E Laballe
*Assistant Examiner* — Noam Reisner
(74) *Attorney, Agent, or Firm* — Cowan, Liebowitz & Latman, P.C.

(57) ABSTRACT

A radiation image processing apparatus which processes non-spiral projection data obtained by radiation imaging performed by rotating a radiation generator and a two-dimensional radiation detector relative to a subject reconstructs the non-spiral projection data into first volume data subjected to an averaging process in a direction of a rotation axis of the rotation and second volume data not subjected to the averaging process. The radiation image processing apparatus performs planar reconstruction calculation using the first volume data to generate a cross section image in a first plane perpendicular to the direction of the rotation axis and performs planar reconstruction calculation using the second volume data to generate a cross section image in a second plane parallel to the direction of the rotation axis. The resulting cross section images are displayed on a display apparatus.

13 Claims, 10 Drawing Sheets

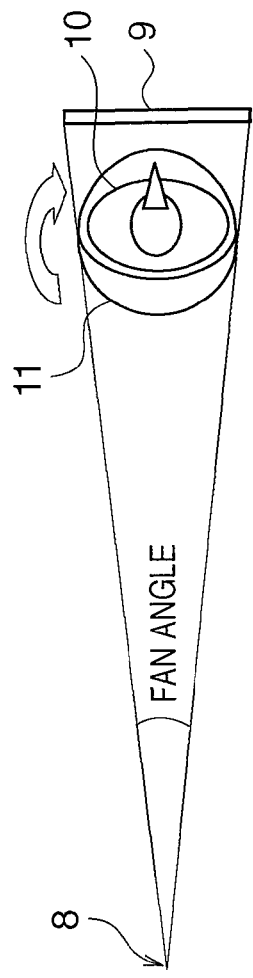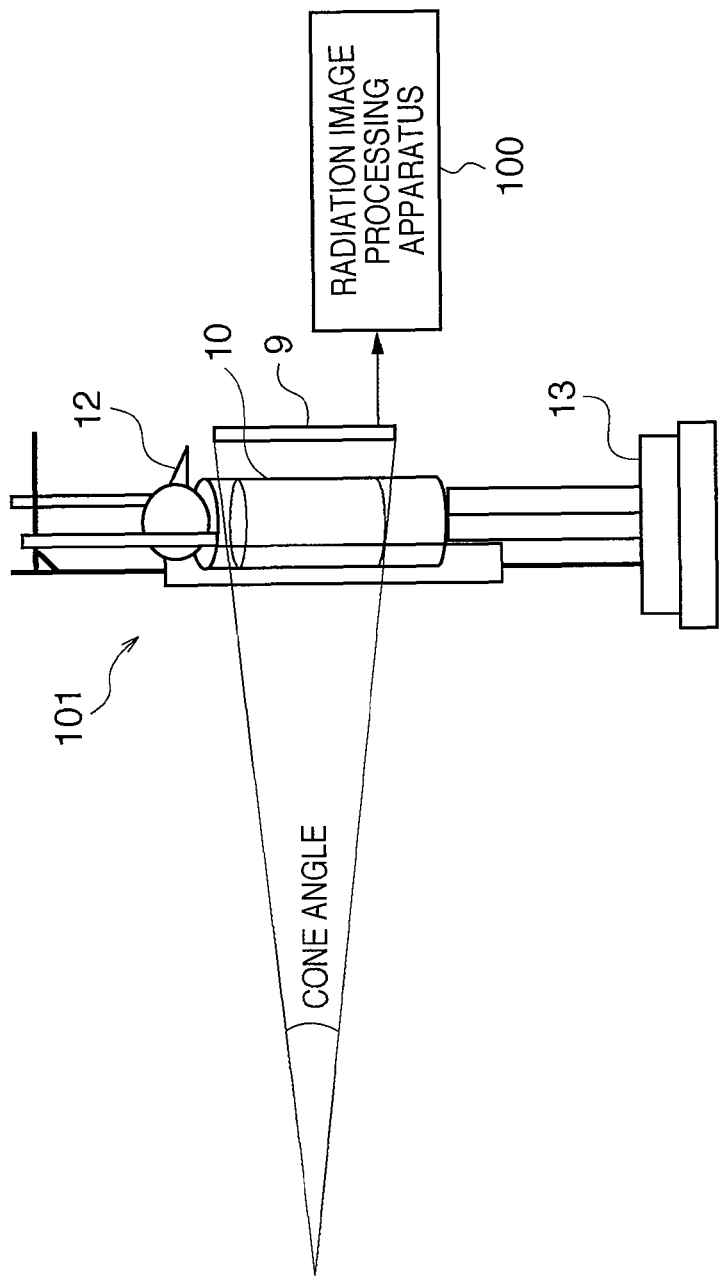
F I G. 2A
F I G. 2B

FIG. 7A FOUR-POINT INTERPOLATION

FIG. 7B EIGHT-POINT INTERPOLATION

FIG. 7C NON-RECTANGULAR INTERPOLATION

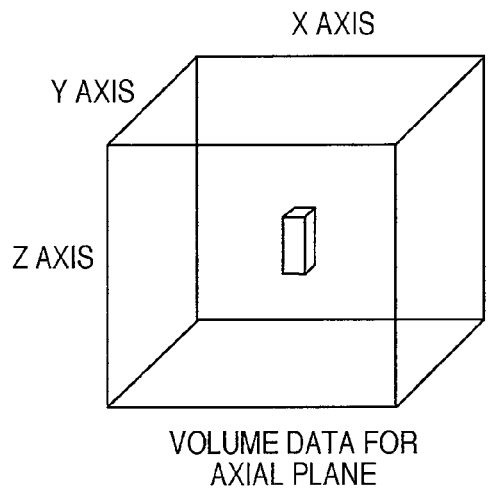
VOLUME DATA FOR
AXIAL PLANE
F I G. 12A
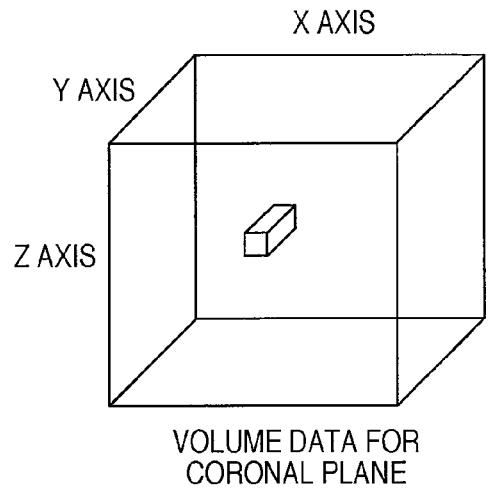
VOLUME DATA FOR
CORONAL PLANE
F I G. 12B
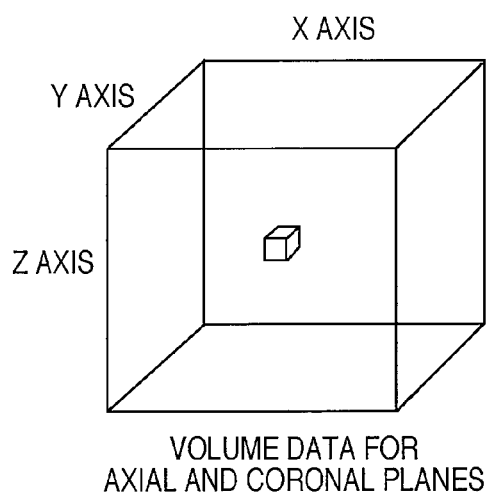
VOLUME DATA FOR
AXIAL AND CORONAL PLANES
F I G. 13A
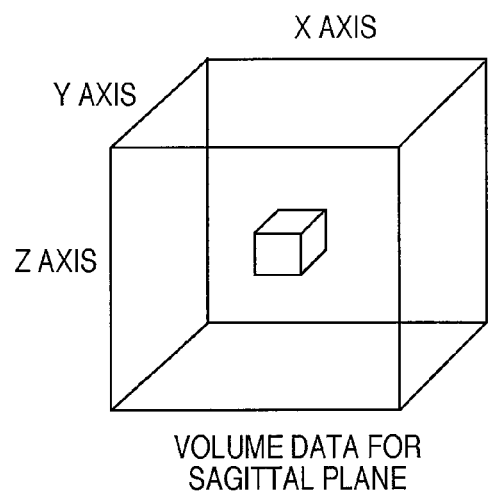
VOLUME DATA FOR
SAGITTAL PLANE
F I G. 13B

RADIATION IMAGE PROCESSING APPARATUS AND METHOD THEREOF

BACKGROUND OF THE INVENTION

1. Field of the Invention

The present invention relates to a radiation image pickup apparatus which constructs images of a radiation characteristic distribution in a subject using radiation in general such as X-rays.

2. Description of the Related Art

Radiation image pickup apparatus which construct images of a radiation characteristic distribution in a subject using radiation in general include, for example, an X-ray CT apparatus which performs imaging using X-rays. Recently, in particular, cone-beam CT apparatus capable of taking and reconstructing three-dimensional images (a large number of thin-slice images), such as described in Japanese Patent Laid-Open No. 2005-021670 (hereinafter referred to as patent document 1), have come into wide use. Also, a technique has been proposed for performing multi planar reconstruction of three-dimensional images (a large number of thin-slice images) using MPR (Multi Planar Reconstruction or Reformatting) and displaying resulting images, where the three-dimensional images are obtained by a CT apparatus. Surgeons observe images (cross section images) obtained from high-resolution CT images by such multi planar reconstruction.

Japanese Patent Laid-Open No. 2004-215961 (hereinafter referred to as patent document 2) proposes a technique for calculating and generating volume data from thin-slice volume data on other coordinate axes and thereby improving interpretation of radiogram based on a stack display of tomographic images. According to patent document 2, tomographic image generating means generates a plurality of items of tomographic image data which carry respective tomographic images obtained by slicing three-dimensional space represented by volume data V at slice intervals set along a preset slice axis. The volume data V is acquired by volume data acquiring means and the slice axis and slice intervals are set by slice condition setting means. Subject existence range recognizing means determines whether a subject image is contained in each of the tomographic images. An existence range of tomographic images determined to contain a subject image is recognized to be a range in which a subject exists along the slice axis and only the tomographic images in the range are displayed in a stack by display means.

Japanese Patent Laid-Open No. 2002-224100 (hereinafter referred to as patent document 3) describes a technique for displaying multiple types of CT image (2D image, MPR, and MIP) generated in advance, on a plurality of display apparatus simultaneously. Patent document 3 is aimed at reducing data processing time required to create the multiple types of CT image. The medical diagnostic apparatus according to patent document 3 includes data detecting means which obtains data for use to create a CT image along a predetermined slice plane from a subject M and a data processing unit which performs an image reconstruction process on the data for use to create a CT image and thereby obtains a reconstructed image. The data processing unit includes a plurality of image reconstruction means to perform multiple types of image reconstruction processes under different reconstruction conditions in parallel. This makes it possible to reduce the data processing time required to create the multiple types of CT image.

Japanese Patent Laid-Open No. 2004-194869 (hereinafter referred to as patent document 4) describes a technique for creating thick-slice volume data from thin-slice volume data and displaying the thick-slice volume data.

Recently, a cone-beam CT technique which uses a large two-dimensional X-ray detector such as disclosed in patent document 1 has been developed. The two-dimensional X-ray detector has an elevation of approximately 43 cm in a body axis direction, eliminating the need for spiraling (so-called "non-spiral CT"). In the process of developing the non-spiral cone-beam CT, the inventors have found that a conventional multi planar reconstruction display method cannot fully exploit features of the non-spiral cone-beam CT.

The non-spiral structure eliminates the need for z-axis interpolation of projection data (the z-axis is an axis going straight to a plane of rotation of an x-ray tube and generally coincides with a body axis of a human body). However, multi planar reconstruction display of multi-slice volume data without z-axis interpolation results in low granularity in an axial plane while providing high resolution in a coronal plane and sagittal plane. If filtering is applied in a z-axis direction to avoid this phenomenon, sharpness in the coronal plane and sagittal plane is lost although the granularity in the axial plane is improved.

SUMMARY OF THE INVENTION

A typical embodiment of the present invention provides a radiation image processing apparatus and method which can produce multi planar reconstruction images in each direction with high image quality based on image information obtained by non-spiral cone-beam CT.

According to one aspect of the present invention, there is provided a radiation image processing method for processing non-spiral projection data obtained by radiation imaging performed by rotating a radiation generator and a two-dimensional radiation detector relative to a subject, comprising:

a reconstruction step of reconstructing the non-spiral projection data into first volume data subjected to an averaging process in a direction of a rotation axis of the rotation and second volume data not subjected to the averaging process;

a calculation step of performing planar reconstruction calculation using the first volume data to generate a cross section image in a first plane perpendicular to the direction of the rotation axis and performing planar reconstruction calculation using the second volume data to generate a cross section image in a second plane parallel to the direction of the rotation axis from the second volume data; and a display step of displaying the cross section images obtained by the planar reconstruction calculation on a display apparatus.

According to another aspect of the present invention, there is provided a radiation image processing apparatus which processes non-spiral projection data obtained by radiation imaging performed by rotating a radiation generator and a two-dimensional radiation detector relative to a subject, comprising:

a reconstruction unit configured to reconstruct the non-spiral projection data into first volume data subjected to an averaging process in a direction of a rotation axis of the rotation and second volume data not subjected to the averaging process;

a calculation unit configured to perform planar reconstruction calculation using the first volume data to generate a cross section image in a first plane perpendicular to the direction of the rotation axis and perform planar reconstruction calculation using the second volume data to generate a cross section image in a second plane parallel to the direction of the rotation axis; and a display unit configured to display the cross section images obtained by the planar reconstruction calculation.

Further features of the present invention will become apparent from the following description of exemplary embodiments (with reference to the attached drawings).

BRIEF DESCRIPTION OF THE DRAWINGS

FIGS. 2A and 2B are diagrams for illustrating a non-spiral CT imaging apparatus as an example of a radiation image pickup apparatus;

FIGS. 12A and 12B are diagrams showing an example in which a pixel aspect differs between volume data, according to a sixth embodiment;

FIGS. 13A and 13B are diagrams showing an example in which pixel size differs between volume data, according to the sixth embodiment.

DESCRIPTION OF THE EMBODIMENTS

Exemplary embodiments of the present invention will now be described in detail in accordance with the accompanying drawings.

<First Embodiment>

Figure 1:
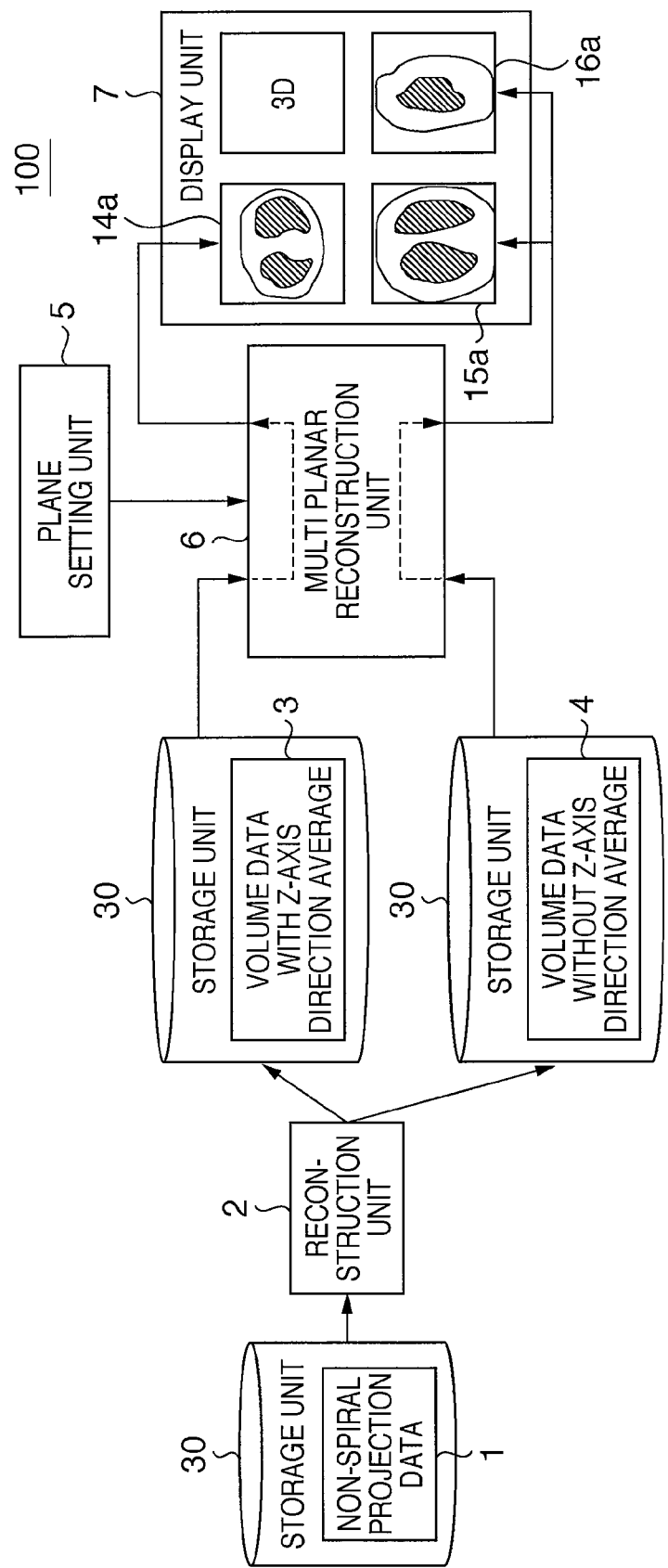
FIG. 1 is a diagram showing a configuration example of a radiation image processing apparatus according to a first embodiment.

FIG. 1 is a diagram showing a configuration example of a radiation image processing apparatus 100 according to a first embodiment. FIGS. 2A and 2B are diagrams showing a radiation image pickup apparatus 101 which acquires non-spiral projection data, according to the first embodiment.

As shown in FIGS. 2A and 2B, a subject 12 is placed in a standing position on a turning table 13 using a back rest 11 and rotated in synchronization with exposure to x-rays emitted from an x-ray generating unit 8. During an exposure, two-dimensional projection data corresponding to a reconstruction area 10 is collected by a two-dimensional X-ray detector 9. The two-dimensional projection data collected while the subject 12 is rotated a single or half turn is stored as non-spiral projection data 1 in a storage unit 30.

Referring to FIG. 1, two types of volume data (three-dimensional image data) are generated from the non-spiral projection data 1 by a reconstruction unit 2. Non-spiral cone-beam CT data can be reconstructed using the Feldkamp algorithm. For Feldkamp reconstruction, refer to Feldkamp, Davis, and Kress, "Practical Cone-Beam Algorithm," J. Opt. Soc. Am. Al, 612-619, 1984.

In a computational process of the Feldkamp method, projection data is not averaged in a z-axis direction before back projection. The z-axis direction here goes straight to a plane of rotation of the x-ray generating unit 8 and generally coincides with a body axis of the subject 12. The two types of volume data generated by the reconstruction unit 2 are volume data with z-axis direction average 3 and volume data without z-axis direction average 4. The volume data without z-axis direction average 4 is volume data reconstructed using the Feldkamp method directly. On the other hand, the volume data with z-axis direction average 3 is volume data obtained by back projection after the projection data is averaged in the z-axis direction. Incidentally, the averaging according to the present embodiment means averaging of two or more lines. The two types of volume data are stored in the storage unit 30.

Figure 3:
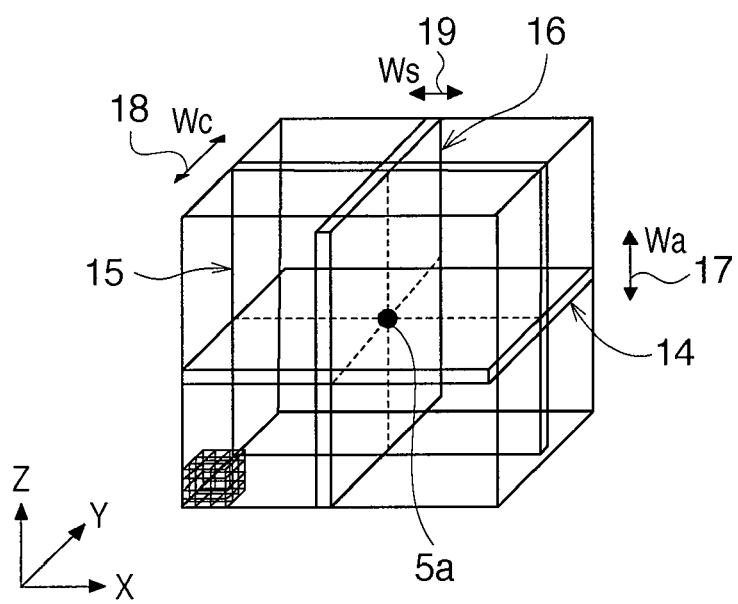
FIG. 3 is a diagram showing a setup example of an axial plane, coronal plane, and sagittal plane.
Figure 4:
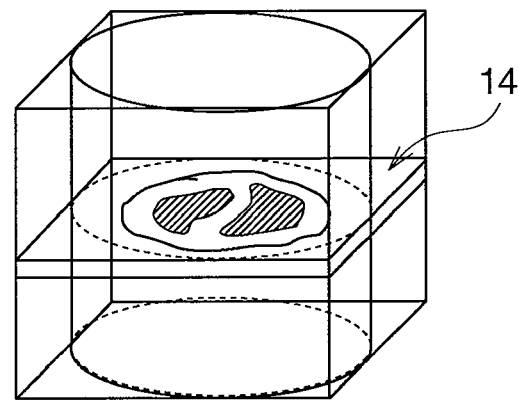
FIG. 4 is a diagram showing an example of an axial plane.
Figure 5:
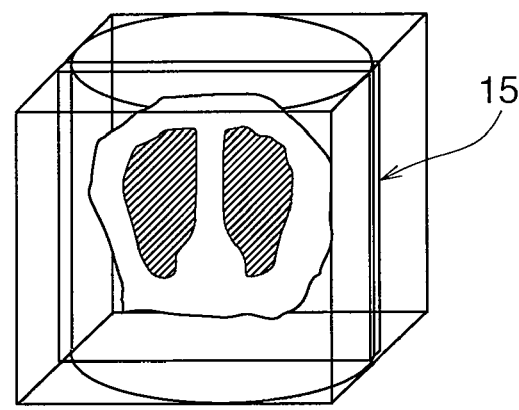
FIG. 5 is a diagram showing an example of a coronal plane.

A plane setting unit 5 determines positions of an axial plane 14, coronal plane 15, and sagittal plane 16 in volume data formed by a three-dimensional pixel array such as shown in FIG. 3. Specifically, by moving a plane position pointer 5a (black spot) shown in FIG. 3 in three-dimensional space, it is possible to designate the position of each plane. The plane setting unit 5 can set thickness of each plane as well as the position of the plane. In FIG. 3, Wa 17, Wc 18, and Ws 19 represent thicknesses W designated for the axial plane 14, coronal plane 15, and sagittal plane 16, respectively. Each plane is selected, for example, such that the plane position pointer 5a will be placed at the center in the thickness direction (see a third embodiment). FIGS. 4 and 5 illustrate how a cross section image in the axial plane 14 and coronal plane 15 looks, by taking the human chest as an example.

Returning to FIG. 1, a multi planar reconstruction unit 6 allows the plane setting unit 5 to designate the position of a plane and calculates cross section images at the position designated by the plane setting unit 5 in the volume data. The cross section images generated by the multi planar reconstruction unit 6 are cross section images in the axial plane 14, coronal plane 15, and sagittal plane 16. In this case, coordinate axes of the volume data with z-axis direction average 3 coincides exactly with coordinate axes of the volume data without z-axis direction average 4. Thus, according to the present embodiment, it is necessary to average the volume data in the z-axis direction in such a way as not to cause phase variation by an averaging process.

Planar reconstruction calculation is implemented by averaging. In so doing, a weighted average may be calculated with weights assigned along the thickness direction. Specifically, in calculating the weighted average, weights assigned to pixel values can be varied between pixels located in central part and peripheral part of the widths (Wa, Wc, Ws) in FIG. 3. The volume data with z-axis direction average 3 is used to calculate axial images and the volume data without z-axis direction average 4 is used to calculate coronal images and sagittal images. The cross section images calculated by the multi planar reconstruction unit 6 are displayed at predetermined locations. In FIG. 1, an axial image 14a is displayed in upper left part, a coronal image 15a is displayed in lower left part, and a sagittal image 16a is displayed in lower right part of a display unit 7. In upper right part of the display unit 7, a 3D image or an enlarged cross section image is displayed as required. Calculation and display of the cross sections are updated in real time when the position of the plane position pointer 5a is updated by the plane setting unit 5.

Figure 6:
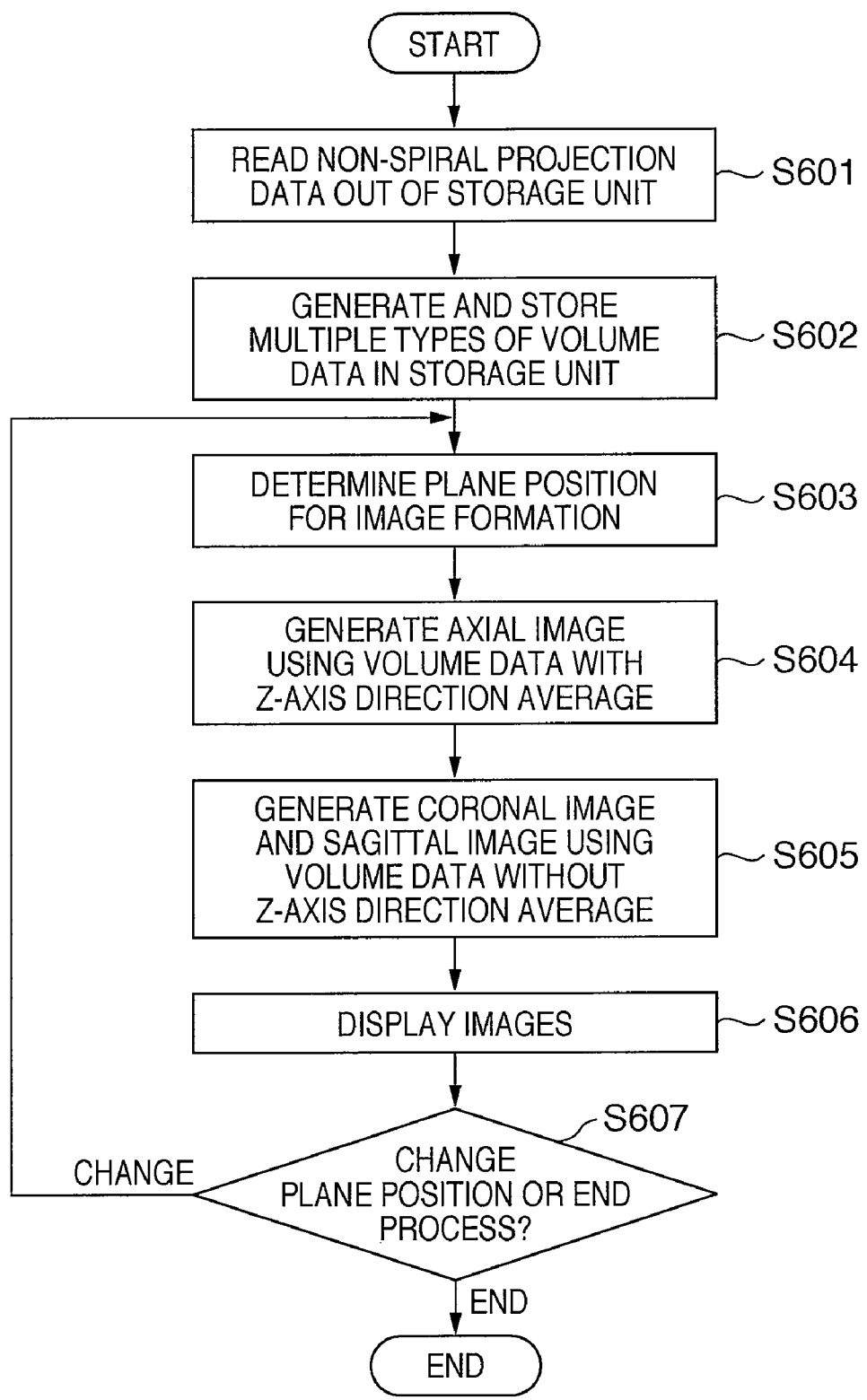
FIG. 6 is a flowchart for illustrating the process of creating a cross section image according to the first embodiment.

The radiation image display process performed by the radiation image processing apparatus according to the first embodiment of the present invention will be described further with reference to a flowchart in FIG. 6. First, in Step S601, the reconstruction unit 2 reads non-spiral projection data 1 out of the storage unit 30. In Step S602, the reconstruction unit 2 generates multiple types of volume data and stores the generated data in the storage unit 30. According to the present embodiment, the reconstruction unit 2 generates volume data with z-axis direction average 3 and volume data without z-axis direction average 4.

In Step S603, the plane setting unit 5 acquires the position of the plane position pointer 5a designated by a user and determines a plane position in which an image is to be formed. Incidentally, the plane setting unit 5 provides a user interface to allow the user to designate the position of the plane position pointer 5a. In Step S604, the multi planar reconstruction unit 6 generates an image in the axial plane using the volume data with z-axis direction average 3. In Step S605, the multi planar reconstruction unit 6 generates images in the sagittal plane and coronal plane using the volume data without z-axis direction average 4. In Step S606, the multi planar reconstruction unit 6 displays the images generated in Steps S604 and S605 on the display unit 7.

Subsequently, when the user changes the plane position using the plane position pointer Sa and the plane setting unit 5 receives the change, the flow returns from Step S607 to Step S603 to generate and display cross section images in the new plane position. When the user enters a command to end the process, the process is finished.

Incidentally, the reconstruction unit 2 may generate the multiple types of volume data (Step S602) after, rather than before, the first plane position is designated. Also, there is not particular limit to the order of the plane—axial, sagittal, and coronal—on which images are generated.

Thus, according to the first embodiment, the volume data reconstructed by averaging the projection data in the z-axis direction is used to calculate the axial plane. On the other hand, the volume data reconstructed without averaging the projection data in the z-axis direction is used to calculate the coronal plane and sagittal plane. Thus, the volume data used to calculate the axial plane and the volume data used to calculate the coronal plane and sagittal plane differ in z-axis resolution. The z-axis goes straight to an orbital plane of x-rays used to collect the non-spiral projection data 1.

Speaking more generally, the radiation image processing apparatus according to the first embodiment processes the non-spiral projection data 1 obtained by radiation imaging performed by rotating the x-ray generating unit 8 and the two-dimensional X-ray detector 9 relative to the subject 12, where the x-ray generating unit 8 serves as a radiation generator and the two-dimensional X-ray detector 9 serves as a two-dimensional radiation generator. The reconstruction unit 2 obtains first volume data (volume data with z-axis direction average 3) by reconstructing non-spiral projection data subjected to an averaging process in a direction of a rotation axis. The multi planar reconstruction unit 6 performs planar reconstruction calculation to generate a cross section image in a first plane (the axial plane 14) perpendicular to the direction of the rotation axis, from the first volume data. The cross section image (e.g., an axial image) obtained as a result of the planar reconstruction calculation is displayed on the display unit 7 serving as a display apparatus. Also, the reconstruction unit 2 reconstructs second volume data (volume data without z-axis direction average 4) not averaged in the direction of the rotation axis, from the non-spiral projection data 1. The multi planar reconstruction unit 6 generates a cross section image in a second plane (e.g., the coronal plane 15 or sagittal plane 16) parallel to the direction of the rotation axis from the second volume data and displays the cross section image on the display unit 7.

Regarding the weighted average used in the averaging process, weights may be assigned to multiple points in the z-axis direction. The present embodiment configured as described above makes it possible to observe the axial plane with high granularity without damage to a feature of non-spiral CT, that is, high resolution in the z-axis direction.

<Second Embodiment>

Figure 7:
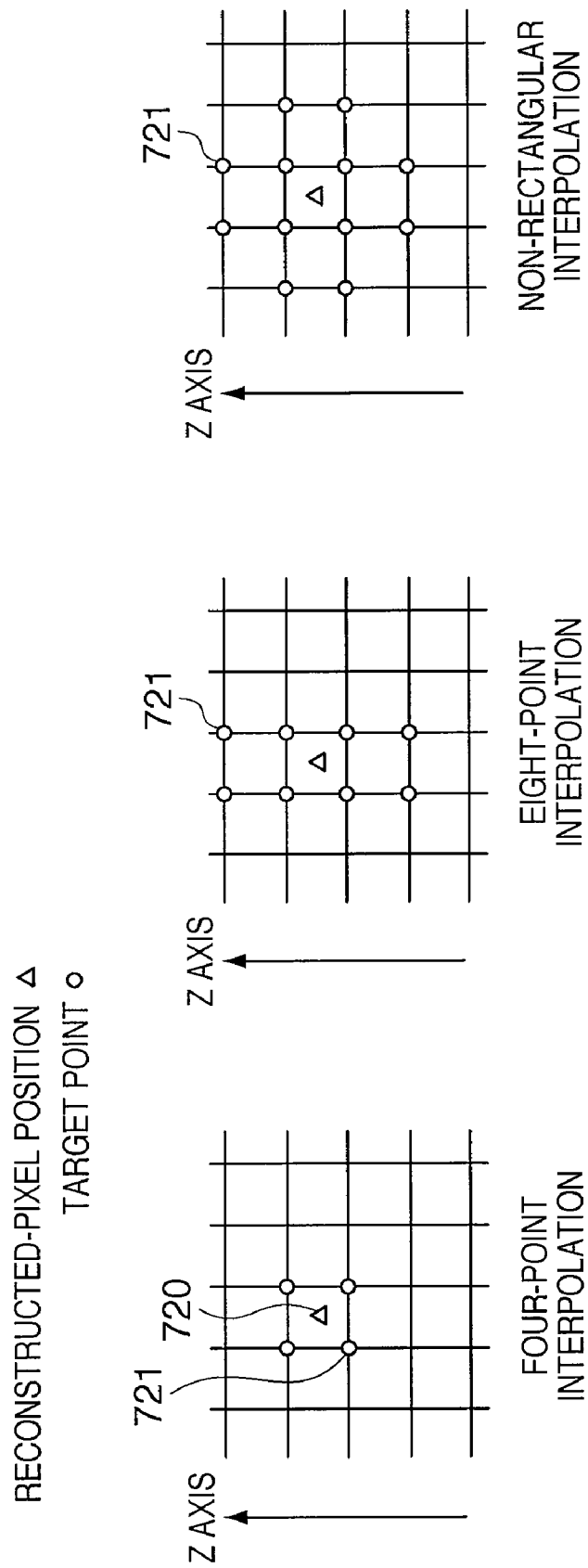
FIGS. 7A to 7C are diagrams showing an example of interpolation during back projection according to a second embodiment.

Next, a second embodiment will be described. According to the first embodiment, to create the volume data with z-axis direction average 3, back projection is performed after the averaging process of the projection data in the z-axis direction. In contrast, according to the second embodiment, the reconstruction unit 2 creates the volume data with z-axis direction average 3 by changing the number of interpolation points during back projection without performing a z-axis averaging process on the projection data. FIGS. 7A to 7C are diagrams for illustrating changes in the number of interpolation points during back projection according to the second embodiment. Back projection is generally implemented by four-point interpolation of a reconstructed-pixel position 720 using four target points 721 in projection data (FIG. 7A). In contrast, the second embodiment takes advantage of z-axis averaging using six-point or eight-point interpolation by increasing the number of target points 721 in the z-axis direction. FIG. 7B shows an example of eight-point interpolation. An advantage of implementing z-axis averaging by changing the number of target points 721 is that there is no need to limit an arrangement of the target points 721 to a rectangle such as shown in FIG. 7C, but the back projection of projection data takes a longer time than an averaging process.

Thus, according to the second embodiment, the volume data reconstructed by averaging the projection data in the z-axis direction is used for calculation in the axial plane. The averaging process according to the second embodiment includes computations which, having low-pass characteristics in the z-axis direction, change (reduce) the number of interpolation points for back projection. Of course, in the averaging process, computations with such low-pass characteristics and a weighted average with weights assigned to multiple points may be used in combination. According to the second embodiment, the averaging process can produce an averaging effect flexibly even in the process of back projection.

<Third Embodiment>

Figure 8:
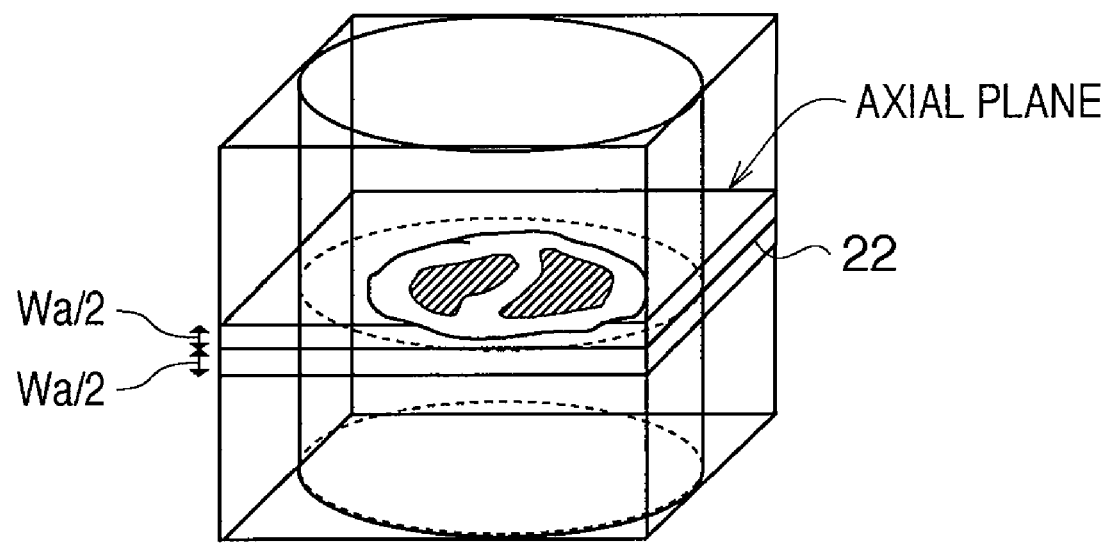
FIG. 8 is a diagram showing a relationship between a displayed line and cross-sectional thickness on a cross section on a GUI according to a third embodiment.

Next, a third embodiment will be described. In FIG. 3, the plane setting unit 5 designates a plane to be set up, using a point or thin line regardless of the thickness of the plane to be calculated. This is because it is difficult to set up a plane for a small lesion using a thick line. However, this makes it impossible for an operator to intuitively determine a center line of plane thickness W. Besides, the operator may think that a thin line displayed in the plane setting unit 5 indicates an edge of the plane to be calculated. To deal with this, according to the third embodiment, an averaging process is performed such that a displayed line 22 will appear in the center of the plane thickness W, as shown in FIG. 8.

Thus, according to the third embodiment, if the thickness W of the plane calculated by the multi planar reconstruction unit 6 is divided into two parts with a thickness of W/2 on both sides of the plane set up by the plane setting unit 5, it is possible to resolve a discrepancy between a plane setting GUI and resulting plane display. Also, the user may be allowed to set the line 22 at any position including an edge of the plane thickness W.

<Fourth Embodiment>

Figure 9C:
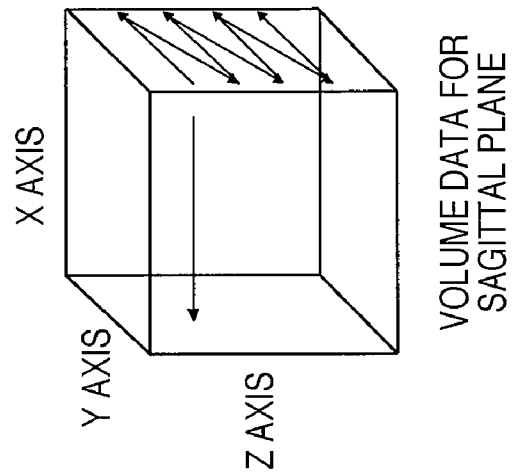
FIGS. 9A to 9C are diagrams showing an example of volume data addressing according to a fourth embodiment.
Figure 9B:
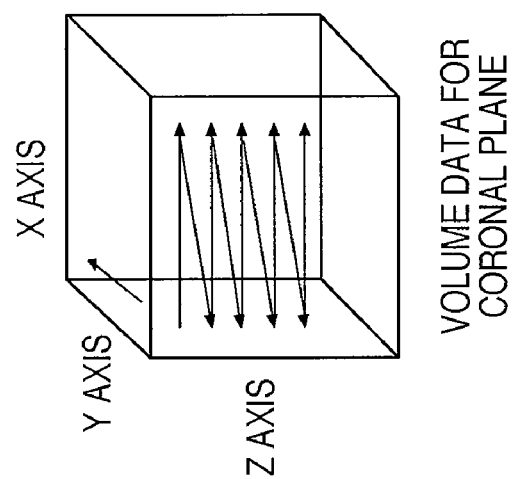
Figure 9A:
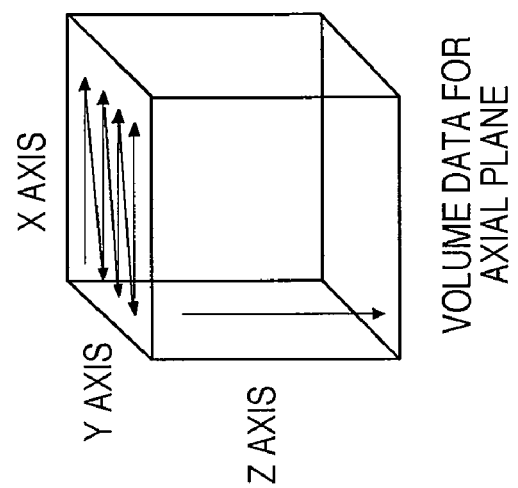

Next, a fourth embodiment will be described. The fourth embodiment is distinguished for a method for holding volume data. The multi planar reconstruction unit 6 can be implemented without using special hardware. When the multi planar reconstruction unit 6 is implemented, for example, by a computer (CPU), memory access time and thus calculation time varies depending on an address order of a three-dimensional array which holds volume data. Therefore, according to the fourth embodiment, the volume data is held in the address order suitable for calculating the axial plane, coronal plane, and sagittal plane. FIG. 9A shows how this is done. As shown in FIG. 9A, the volume data used to calculate the axial plane 14 is held in such a way that one axial section has successive addresses. Similarly, the volume data used to calculate the coronal plane 15 is held in such a way that one coronal section 15 has successive addresses as shown in FIG. 9B. Also, the volume data used to calculate the sagittal plane 16 is held in such a way that one sagittal section 16 has successive addresses as shown in FIG. 9C. This allows each image to be taken out quickly during computation of a plane which has a thickness, making it possible to speed up the computation as a whole.

Thus, according to the fourth embodiment, when multiple items of volume data corresponding to the axial plane, coronal plane, and sagittal plane are saved, the three-dimensional arrays of the volume data are recorded in different orders. That is, according to the fourth embodiment, the reconstruction unit 2 holds first to third retention data corresponding to a first plane which corresponds to the axial plane, second plane which corresponds to the coronal plane, and third plane which corresponds to the sagittal plane, where the first to third retention data differs in the recording order of the three-dimensional array. The first retention data is the first volume data (volume data with z-axis direction average 3) stored in memory in such a way that pixel data in a plane parallel to the first plane (a plane which includes an x axis and y axis) will have successive addresses (FIG. 9A). The second retention data is the second volume data (volume data without z-axis direction average 4) stored in memory in such a way that pixel data in a plane parallel to the second plane (a plane which includes an x axis and z axis) will have successive addresses (FIG. 9B). Similarly, the third retention data is the third volume data (volume data without z-axis direction average 4) stored in memory in such a way that pixel data in a plane parallel to the third plane (a plane which includes a y axis and z axis) will have successive addresses (FIG. 9C). The multi planar reconstruction unit 6 generates cross section images which correspond to the first to third planes by reading the first to third retention data, respectively. With this configuration, the fourth embodiment speeds up data reads in multi planar reconstruction processes to the cross sections, and thereby speeds up the multi planar reconstruction processes.

<Fifth Embodiment>

Next, a fifth embodiment will be described. According to the first to fourth embodiments, the cross section to be subjected to multi planar reconstruction is set up in such a way as to be parallel to a plane which includes two axes out of the coordinate axes (x, y, and z axes in FIG. 3 and FIGS. 9A to 9C) of reconstructed volume data, that is, parallel to any of XY, YZ, and ZX planes. However, depending on distribution of lesions, it will become necessary to observe a cross section in a plane not parallel to any of the XY, YZ, and ZX planes. The radiation image processing apparatus 100 according to the fifth embodiment allows such a cross section to be displayed.

Hereinafter, the XY, YZ, and ZX planes will be referred to collectively as XYZ planes.

Figure 10:
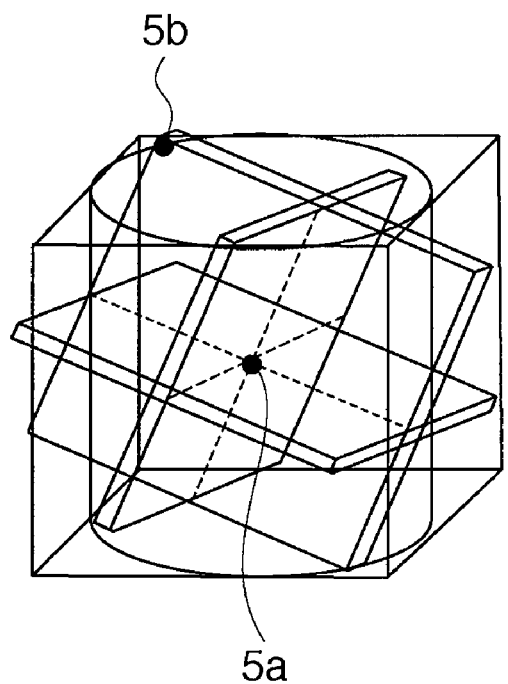
FIG. 10 is a diagram showing a setup example of an oblique plane according to a fifth embodiment.
Figure 11:
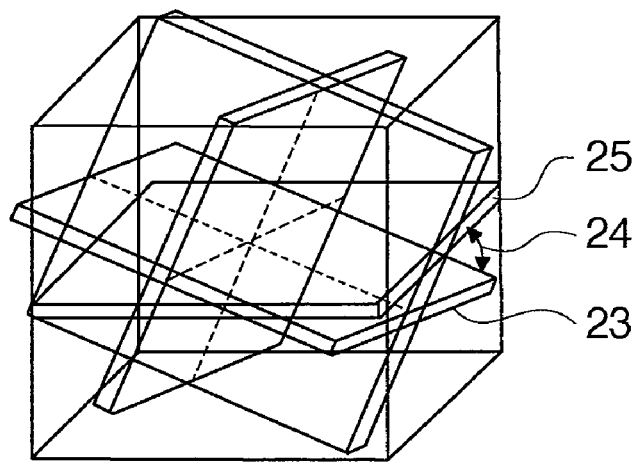
FIG. 11 is a diagram showing an angle formed by an oblique plane and XYZ planes.

In this case, as shown in FIG. 10, in addition to the plane position pointer 5a, the plane setting unit 5 has a plane rotating pointer 5b to rotate the three cross sections all together. The cross section set up in this way is generally referred to as an oblique plane 23 (FIG. 11). If volume data is stored by a storage method based on the plane as in the case of the fourth embodiment, there is the problem of what volume data to use in calculating the oblique plane 23. To deal with this, a method according to the fifth embodiment calculates an angle 24 formed by the oblique plane 23 and each of the XYZ planes 25 and uses the volume data corresponding to the XYZ plane which minimizes the angle. This is because the XYZ planes have characteristics similar to characteristics required of the oblique plane 23. The angle formed by the two planes is calculated using a straight line formed by an intersection of the two planes as a center axis.

Thus, according to the fifth embodiment, if multiple cross sections set up for multi planar reconstruction do not coincide with any of the axial plane, coronal plane, and sagittal plane, angles formed by the set cross sections and the axial plane, coronal plane, and sagittal plane are calculated. Then, the plane which forms the smallest angle with the set cross section is selected out of the axial plane, coronal plane, and sagittal plane and planar reconstruction calculation is performed using the volume data which corresponds to the selected plane. Consequently, even when observing a lesion using cross sections which do not coincide with any of the axial plane, coronal plane, and sagittal plane, it is possible to obtain cross section images with high granularity in cross sections close to the axial plane, and cross section images with high z-axis resolution in cross sections close to the coronal plane and sagittal plane.

<Sixth Embodiment>

Next, a sixth embodiment will be described. According to the first to fifth embodiments, the volume data used for multi planar reconstruction has the same pixel size in all axial directions. According to the sixth embodiment, pixel size varies with the axial direction, namely, voxels are not anisotropic (pixels are not cubic).

FIGS. 12A and 12B show how volume data corresponding to the axial plane 14 and coronal plane 15 is reconstructed from uncubic pixels. When the axial plane 14 is observed, since the volume data has been reconstructed after being averaged in the z-axis direction, there is not much image variation in the z-axis direction. Therefore, there is no diagnostic benefit in increasing the number of reconstructed sections in the z-axis direction. Similarly, when the coronal plane 15 is observed, if it is desired to obtain images with high granularity, it is conceivable to average the volume data in the y-axis direction. However, since there is not much image variation in the y-axis direction, there is no diagnostic benefit in increasing the number of reconstructed sections in the y-axis direction.

Thus, the reconstruction unit 2 holds volume data with reduced resolution in the direction perpendicular to an appropriate plane. The resolution here is stated in terms of the number of pixels per unit length. For example, the volume data for the axial plane is obtained by reducing the resolution in the z-axis direction of the volume data with z-axis direction average 3 as shown in FIG. 12A (the pixel is elongated in the z-axis direction). Also, for example, the volume data for the coronal plane is obtained by reducing the resolution in the y-axis direction of the volume data without z-axis direction average 4 as shown in FIG. 12B. Similarly, the volume data for the sagittal plane is obtained by reducing the resolution in the x-axis direction of the volume data without z-axis direction average 4 (not shown). Incidentally, non-cubic pixels such as those described above can be implemented by adjusting the pitch of reconstructed images in the direction of the appropriate axis in a back projection step.

FIGS. 13A and 13B show an example in which volume data with different pixel sizes is used when cross sections to be observed differ in diagnostic importance. For example, if the sagittal plane 16 has low importance in terms of observation, it is conceivable to reconstruct the sagittal plane 16 using larger pixels than the axial plane 14 and coronal plane 15. In this way, when holding volume data corresponding to the planes, the reconstruction unit 2 may vary the resolution according to the importance of cross section images. Again, the reconstructed volume data with different pixel sizes can be implemented by adjusting the pitch of reconstructed images in the direction of the appropriate axis.

Thus, according to the sixth embodiment, multiple items of volume data are saved with the pixel shape and/or pixel size varied. This provides reconstruction resolution dependent on the direction of the plane. Also, this eliminates the need to spend calculation time on unnecessarily detailed reconstruction.

<Seventh Embodiment>

Figure 14:
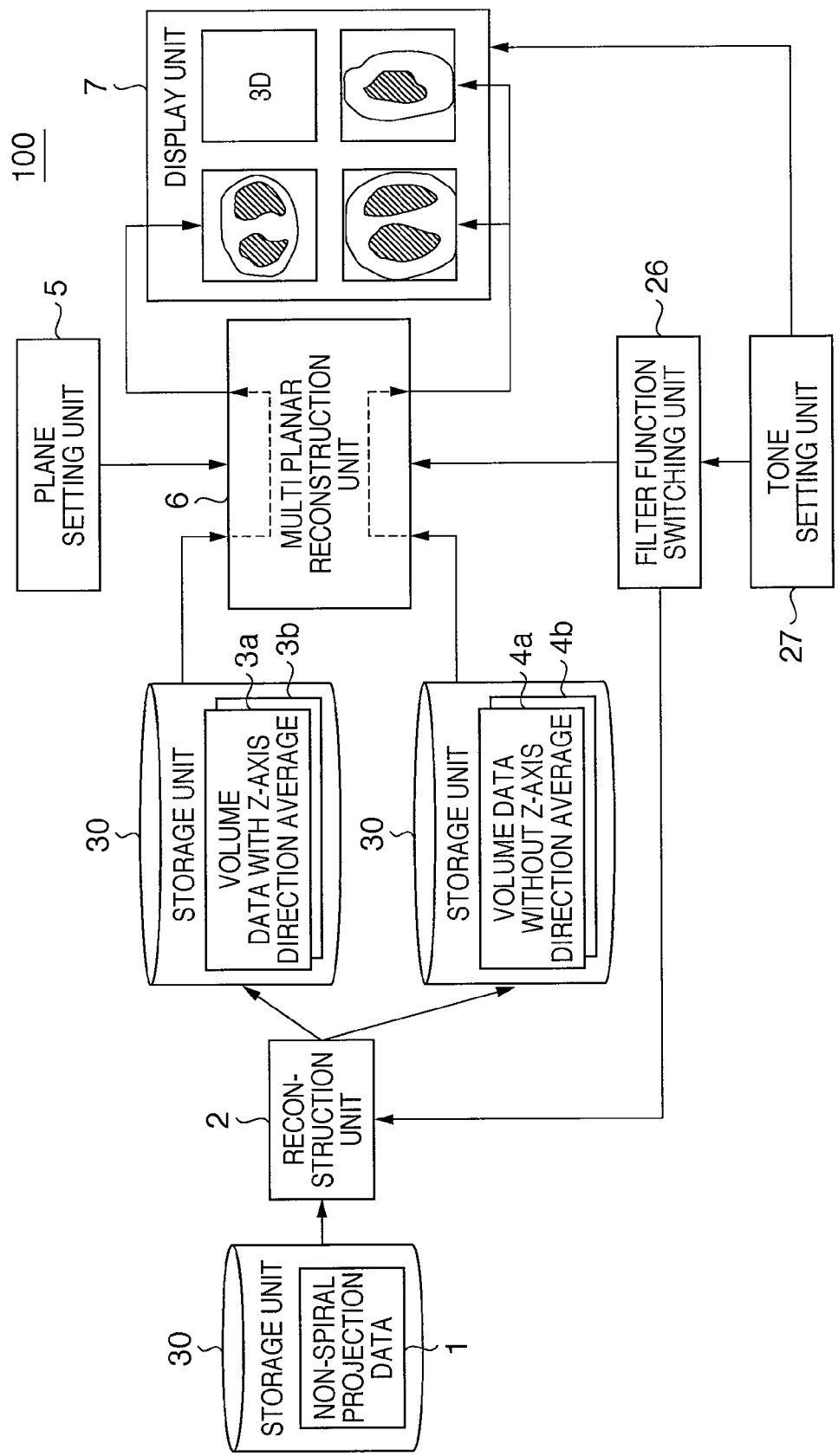
FIG. 14 is a diagram showing a configuration of a radiation image processing apparatus according to a seventh embodiment.

FIG. 14 is a diagram showing a configuration example of a radiation image processing apparatus 100 according to a seventh embodiment. Although the first to sixth embodiments have focused on differences in multi planar reconstruction display among different planes, it is conceivable to switch reconstructed volume data used for multi planar reconstruction even within the same plane. This is the case when an organ of various natures, such as the chest, is observed. Chest imaging includes imaging of lung lobes which requires a high spatial resolution and imaging of the mediastinum which requires representation (density resolution) of qualitative changes such as changes in CT values rather than spatial resolution. Regarding filter functions used for reconstruction, a function (lung lobe function) with good high-frequency characteristics is used for the lung lobes and a function (mediastinum function) with high granularity is used for the mediastinum by attaching importance to low frequencies. Conventionally, a surgeon separately observes images created from two sets of volume data generated using the lung lobe function and mediastinum function. According to the seventh embodiment, by allowing the surgeon to designate which image to observe, a filter function switching unit 26 switches between an image based on the lung lobe function and an image based on the mediastinum function via the multi planar reconstruction unit 6.

Referring to FIG. 14, the reconstruction unit 2 generates volume data based on each of the filter functions possessed by the filter function switching unit 26 and holds the generated volume data in the storage unit 30. For example, if a lung lobe function and mediastinum function are provided as filter functions, the reconstruction unit 2 generates volume data with z-axis direction average 3a using the lung lobe function, and volume data with z-axis direction average 3b using the mediastinum function, and holds the generated volume data. Similarly, the reconstruction unit 2 generates volume data without z-axis direction average 4a using the lung lobe function, and volume data without z-axis direction average 4b using the mediastinum function, and holds the generated volume data. When the user designates images based on the mediastinum function, an axial image is generated using the volume data with z-axis direction average 3b and a coronal image and sagittal image are generated using the volume data without z-axis direction average 4b and the generated images are displayed. Also, when the user designates images based on the lung lobe function, an axial image is generated using the volume data with z-axis direction average 3a and a coronal image and sagittal image are generated using the volume data without z-axis direction average 4a and the generated images are displayed.

Besides, the filter function switching unit 26 can be driven from a tone setting unit 27. That is, if a tone conversion window level is lower than a predetermined level, it is assumed that the surgeon is observing a lung lobe area with low CT values and cross sections are calculated using volume data for lung lobes. If the tone conversion window level is higher than the predetermined level, it is assumed that the surgeon is observing a mediastinum area with high CT values and cross sections are calculated using volume data for the mediastinum. Incidentally, the term "tone conversion window level" means a luminance level for image display. Decreasing this level increases luminance of the entire image. For example, "CT values of lung lobes" do not vary greatly among patients, and thus there is no problem in displaying the image using the "tone conversion window level" preset on the apparatus. On the other hand, for a patient of a special disease, it is sometimes appropriate to change the "tone conversion window level." To meet this need, the "tone conversion window level" is changeable by the operator.

Thus, according to the seventh embodiment, volume data based on multiple reconstruction filter functions is stored and one of the reconstruction filter functions is selected under the direction of the user. When a reconstruction filter function is selected, the volume data reconstructed using the selected reconstruction filter function is used for each of the axial plane, coronal plane, and sagittal plane. That is, using different reconstruction filter functions, the reconstruction unit 2 generates multiple types of volume data with z-axis direction average 3 and multiple types of volume data without z-axis direction average 4. The volume data generated using the reconstruction filter function selected based on user actions is used by the multi planar reconstruction unit 6 for planar reconstruction calculation. Consequently, the user can carry out continuous observations of lung lobes and the mediastinum by chest CT without being conscious of the filter function.

Also, according to the seventh embodiment, in a configuration which allows the user to change the number of tones for tone conversion, a reconstruction filter function is selected through comparison between the designated number of tones and predetermined number of tones. That is, the filter function switching unit 26 selects the reconstruction filter function to be used, by comparing the number of tones set by the tone setting unit 27—which can change the number of tones—with the predetermined number of tones. The volume data generated using the selected reconstruction filter function is used by the multi planar reconstruction unit 6 for planar reconstruction calculation. Consequently, the user can carry out continuous observations of lung lobes and the mediastinum by chest CT or the like without being conscious of the filter function even if the user performs a tone conversion operation.

As described above, the present invention makes it possible to produce multi planar reconstruction images in each direction with high image quality based on image information obtained by non-spiral cone-beam CT.

<Other Embodiments>

Embodiments of the present invention have been described above. Besides, the present invention can be embodied in the form of, for example, a system, apparatus, method, program, storage medium, or the like. Specifically, the present invention may be applied either to a system consisting of multiple apparatus or to equipment consisting of a single apparatus.

Incidentally, the present invention is also achieved when a software program which implements the functions of the above embodiments is supplied directly or remotely to a system or apparatus and program code of the software program is read out and executed by a computer of the system or apparatus. In that case, the program supplied is a computer program which corresponds to the illustrated flowchart according to the embodiments.

Thus, the program code itself installed on the computer to implement functions and processes of the present invention on the computer also implements the present invention. That is, the present invention also includes the computer program which implements the functions and processes of the present invention.

In that case, the program code may take any form including object code, programs executed by an interpreter, and script data supplied to an OS as long as it has program functions.

Examples of the computer-readable storage medium used to supply the computer program include, a flexible (registered trademark) disk, hard disk, optical disk, magneto-optical (MO) disk, CD-ROM, CD-R, CD-RW, magnetic tape, non-volatile memory card, ROM, and DVD (DVD-ROM and DVD-R).

Besides, the program can also be supplied via an Internet homepage. In that case, the user is supposed to connect to an Internet homepage using a browser on a client computer and download the computer program of the present invention onto a recording medium such as a hard disk. The program may be downloaded as a compressed self-installing file. Also, the program code of the program according to the present invention may be divided into multiple files, which can be downloaded from respective homepages. That is, the present invention also includes WWW servers which allow multiple users to download program files capable of implementing the functions and processes of the present invention on a computer.

The present invention may also be distributed to users as a storage medium such as a CD-ROM containing the program of the present invention in encrypted form. In that case, only the users who satisfy predetermined conditions are provided with key information for decryption through a download from an Internet homepage and allowed to decrypt and install the program in executable form on a computer using the key information.

The functions of the above embodiments may be implemented not only by the program read out and executed by the computer, but also in conjunction with an OS or the like running on the computer in accordance with instructions from the program. In that case, the functions of the above embodiments are implemented by part or all of the actual processing executed by the OS or the like.

Furthermore, the functions of the above embodiments may also be implemented by part or all of the actual processing executed by a CPU or the like contained in a function expansion board inserted in the computer or a function expansion unit connected to the computer if the processing is performed in accordance with instructions from the program that has been read out of the storage medium and written into memory on the function expansion board or unit. In this case, the program is written in the function expansion board or function expansion unit, and then, the CPU of the function expansion board or function expansion unit partially or wholly executes actual processing based on the instructions of the program.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2007-224611, filed Aug. 30, 2007, which is hereby incorporated by reference herein in its entirety.

What is claimed is:

1. A radiation image processing method for processing non-spiral projection data obtained by radiation imaging performed by rotating a radiation generator and a two-dimensional radiation detector relative to a subject, comprising:

a reconstruction step of reconstructing the non-spiral projection data into first volume data subjected to an averaging process in a direction of a rotation axis of the rotation and second volume data not subjected to the averaging process;

a saving step of saving the first volume data in memory as first retention data in such a way that pixel data in a plane parallel to a first plane will have successive addresses, saving the second volume data in memory as second retention data in such a way that pixel data in a plane parallel to a second plane will have successive addresses, and saving the second volume data in memory as third retention data in such a way that pixel data in a plane parallel to a third plane will have successive addresses, wherein the first plane is perpendicular to the direction of the rotation axis, the second plane is parallel to the direction of the rotation axis and the third plane is parallel to the direction of the rotation axis and perpendicular to the second plane;

a calculation step of performing planar reconstruction calculation using the first retention data to generate a cross section image in the first plane, performing planar reconstruction calculation using the second retention data to generate a cross section image in the second plane and performing planar reconstruction calculation using the third retention data to generate a cross section image in the third plane; and a display step of displaying the cross section images obtained by the planar reconstruction calculation on a display apparatus.

2. The radiation image processing method according to claim 1, further comprising a designation step of receiving positions designated in the first plane, the second plane and the third plane by a user, wherein said calculation step generates cross section images at the received positions in the designation step in the first plane, the second plane and the third plane.

3. The radiation image processing method according to claim 1, wherein the averaging process includes a weighted average calculation which involves calculating an average with weights assigned to a predetermined number of pixels arranged in the direction of the rotation axis and computation which involves low-pass characteristics used to reduce the number of interpolation points in the direction of the rotation axis during back projection.

4. The radiation image processing method according to claim 2, wherein:

said designation step receives designation of thickness of a cross section image in the first plane, the second plane and the third plane; and said calculation step generates a cross section image which has a thickness of W/2 on both sides of the designated position, where W is the designated thickness of the cross section image.

5. The radiation image processing method according to claim 1, further comprising a designation step of receiving designation of an oblique plane which is not parallel to any of the first plane, the second plane, and the third plane, wherein
said calculation step selects a plane which minimizes an angle formed with the oblique plane out of the first plane, the second plane, and the third plane and generates a cross section image in the oblique plane using the retention data which corresponds to the selected plane.

6. The radiation image processing method according to claim 1, wherein:
the first retention data has reduced resolution in a direction perpendicular to the first plane;
the second retention data has reduced resolution in a direction perpendicular to the second plane; and
the third retention data has reduced resolution in a direction perpendicular to the third plane.

7. The radiation image processing method according to claim 1, wherein at least one of the first retention data, the second retention data, and the third retention data differs in resolution from the other retention data.

8. The radiation image processing method according to claim 1, wherein:
said reconstruction step generates a plurality of types of first volume data or a plurality of types of second volume data using a plurality of reconstruction filter functions; and
said calculation step uses volume data generated using a reconstruction filter selected based on user actions in the planar reconstruction calculation.

9. The radiation image processing method according to claim 8, further comprising a changing step of changing the number of tones, wherein
said calculation step determines the selected reconstruction filter function by comparing the number of tones changed in said changing step with a predetermined number of tones.

10. A radiation image processing apparatus which processes non-spiral projection data obtained by radiation imaging performed by rotating a radiation generator and a two-dimensional radiation detector relative to a subject, comprising:
a reconstruction unit configured to reconstruct the non-spiral projection data into first volume data subjected to an averaging process in a direction of a rotation axis of the rotation and second volume data not subjected to the averaging process;
a saving unit configured to save the first volume data in memory as first retention data in such a way that pixel data in a plane parallel to a first plane will have successive addresses, save the second volume data in memory as second retention data in such a way that pixel data in a plane parallel to a second plane will have successive addresses, and save the second volume data in memory as third retention data in such a way that pixel data in a plane parallel to a third plane will have successive addresses, wherein the first plane is perpendicular to the direction of the rotation axis, the second plane is parallel to the direction of the rotation axis and the third plane is parallel to the direction of the rotation axis and perpendicular to the second plane;
a calculation unit configured to perform planar reconstruction calculation using the first retention data to generate a cross section image in the first plane, perform planar reconstruction calculation using the second retention data to generate a cross section image in the second plane and perform planar reconstruction calculation using the third retention data to generate a cross section image in the third plane; and
a display unit configured to display the cross section images obtained by the planar reconstruction calculation.

11. A non-transitory computer-readable storage medium containing a program causing a computer to perform the radiation image processing method according to claims 1.

12. A radiation image processing method for processing non-spiral projection data obtained by radiation imaging performed by rotating a radiation generator and a two-dimensional radiation detector relative to a subject, comprising:
a reconstruction step of reconstructing the non-spiral projection data into first volume data subjected to an averaging process in a direction of a rotation axis of the rotation and second volume data not subjected to the averaging process;
a calculation step of performing planar reconstruction calculation using the first volume data to generate a cross section image in a first plane perpendicular to the direction of the rotation axis and performing planar reconstruction calculation using the second volume data to generate a cross section image in a second plane parallel to the direction of the rotation axis from the second volume data; and
a display step of displaying the cross section images obtained by the planar reconstruction calculation on a display apparatus; and
a changing step of changing the number of tones, wherein:
said reconstruction step generates a plurality of types of first volume data or a plurality of types of second volume data using a plurality of reconstruction filter functions; and
said calculation step uses volume data generated using a reconstruction filter function selected by comparing the number of tones changed in said changing step with a predetermined number of tones.

13. A radiation image processing apparatus which processes non-spiral projection data obtained by radiation imaging performed by rotating a radiation generator and a two-dimensional radiation detector relative to a subject, comprising:
a reconstruction unit configured to reconstruct the non-spiral projection data into first volume data subjected to an averaging process in a direction of a rotation axis of the rotation and second volume data not subjected to the averaging process;
a calculation unit configured to perform planar reconstruction calculation using the first volume data to generate a cross section image in a first plane perpendicular to the direction of the rotation axis and perform planar reconstruction calculation using the second volume data to generate a cross section image in a second plane parallel to the direction of the rotation axis; and a display unit configured to display the cross section images obtained by the planar reconstruction calculation; and a changing unit configured to change the number of tones, wherein:

said reconstruction unit generates a plurality of types of first volume data or a plurality of types of second volume data using a plurality of reconstruction filter functions; and said calculation unit uses volume data generated using a reconstruction filter function selected by comparing the number of tones changed in said changing step with a predetermined number of tones.

* * * * *